April 5, 1966 A. S. JOUKAINEN 3,243,849
SCREEN CHANGING
Filed May 19, 1964 4 Sheets-Sheet 1

INVENTOR
ARNOLD SIMON JOUKAINEN
BY Robert W Black
ATTORNEY

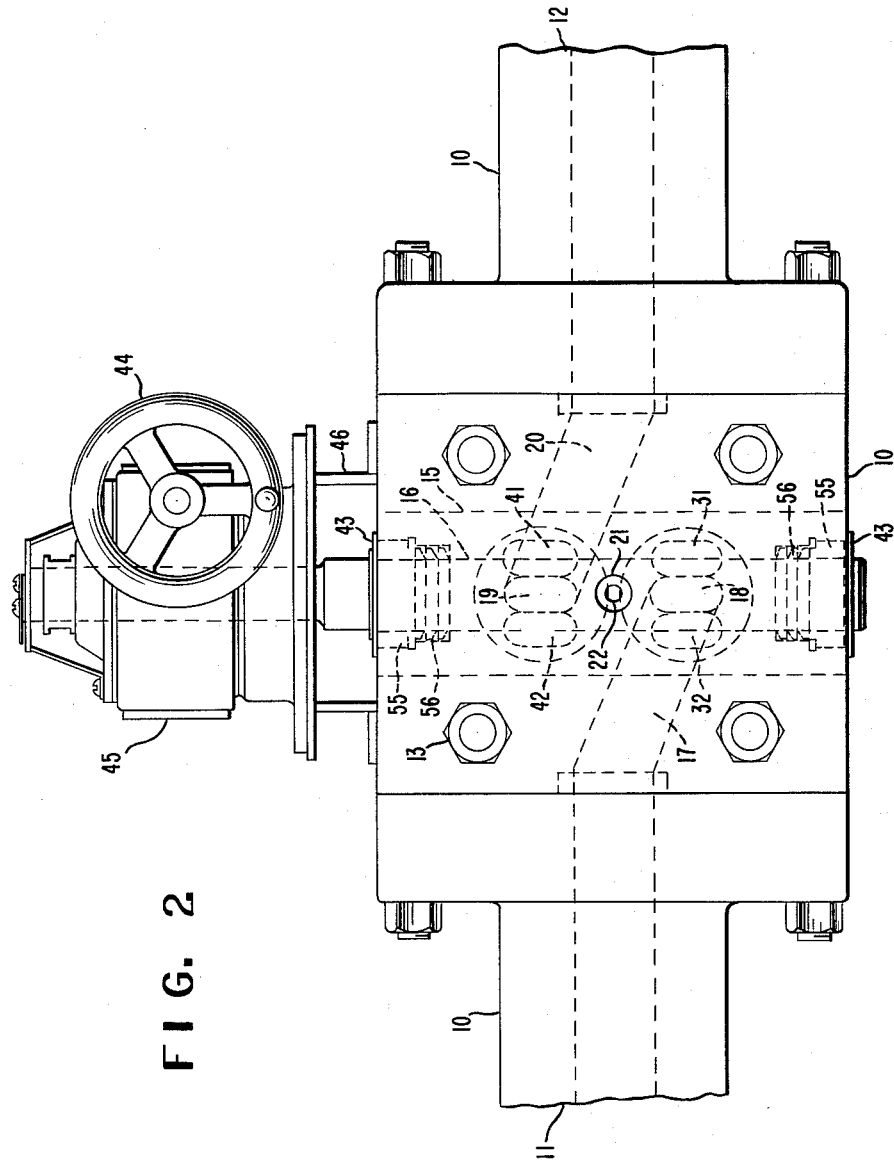

April 5, 1966  A. S. JOUKAINEN  3,243,849
SCREEN CHANGING
Filed May 19, 1964  4 Sheets-Sheet 3
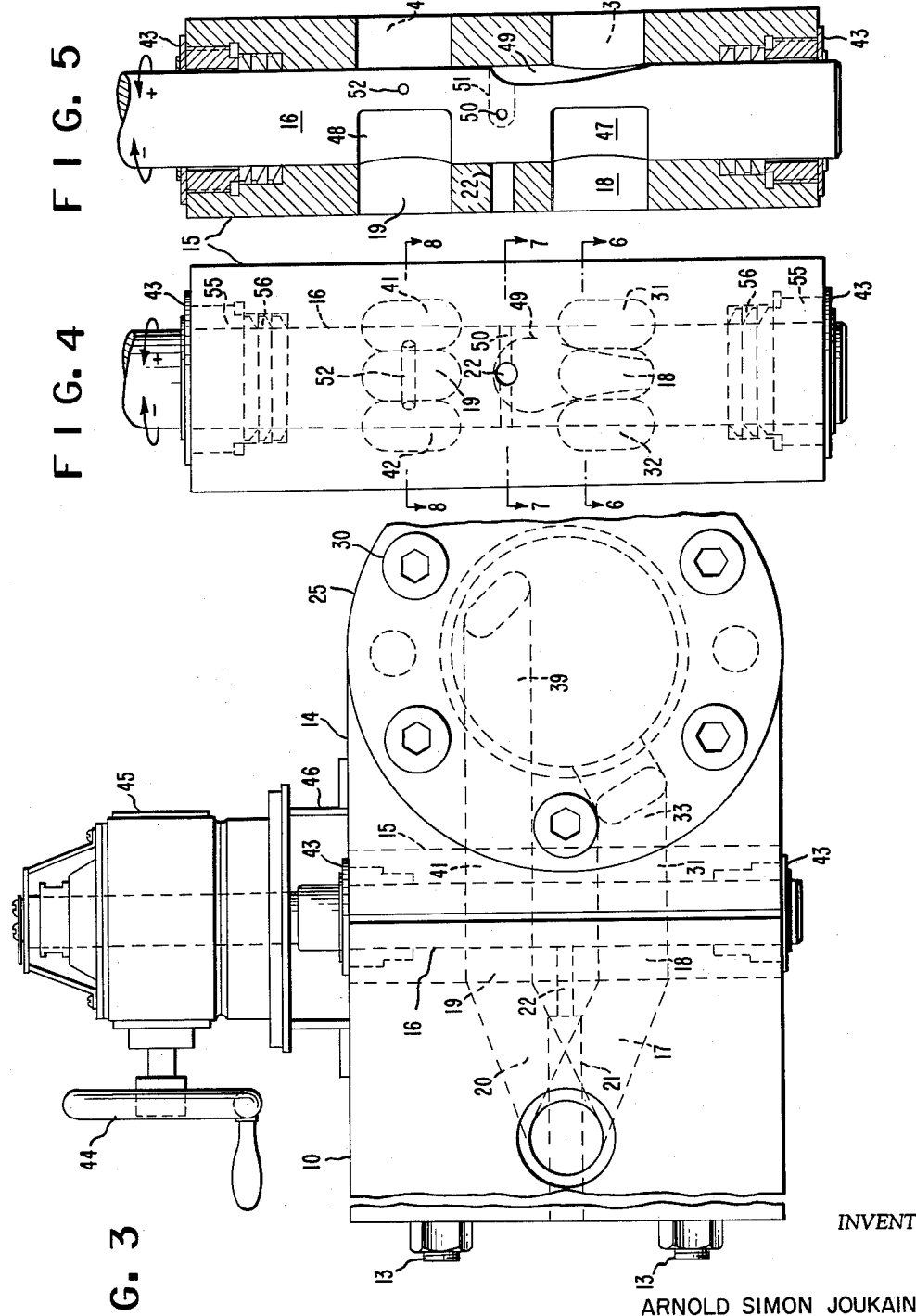
INVENTOR
ARNOLD SIMON JOUKAINEN
BY
ATTORNEY INVENTOR
ARNOLD SIMON JOUKAINEN
BY Roberta Black
ATTORNEY 3,243,849
SCREEN CHANGING
Arnold Simon Joukainen, Wilmington, Del., assignor to
E. I. du Pont de Nemours and Company, Wilmington,
Del., a corporation of Delaware
Filed May 19, 1964, Ser. No. 368,500
2 Claims. (Cl. 18—12)

This invention relates to improved screen changing apparatus and more particularly to flow control valves for screen changing apparatus which are adapted for use with extruders.

The conventional means for removing contaminating particles from thermoplastic melts is through the use of a screen pack. The foreign particles contaminating the plastic material are removed from the molten plastic material which flows first through the screen pack and then through the apertures of its supporting breaker plate. The combined screen and breaker plate are so located between the extruder barrel and the die, or other molding apparatus, that the plastic flows through the screen and breaker plate on its way to the die. Both the screen and breaker plate serve to provide back pressure in the extruder barrel, the back pressure being useful to improve extruder operability and extrudate quality. Excessive back pressures due to fouled screens sufficiently reduce useable extruder capacities such that in many applications it is necessary to change screen packs frequently. Expensive large area screen packs lengthen the time between such changes, but cannot eliminate the need for screen pack changes. Changes of conventional screen packs are expensive as labor is required, production is lost and waste product is made during the time that is necessary to re-establish required extrudate through-put, quality and string-up, etc., after the extruder shut-down.

Various attempts have been made recently to clean or to provide for the change of the combined screen and breaker plate units with the shortest possible or no extruder shut-down. These have taken the form of rapid screen changers, dual screen packs, and screen cleaners and dual screen packs with back-flush features. Screen cleaners with single packs must be shut down for screen pack replacement. Rapid screen changers, which in general use a breaker plate with a clean screen to force out a fouled assembly, have limited areas and generally require extruder shut-downs. For these units to operate at high extrusion pressures without seriously interrupting flow requires that special seals, pre-heat facilities and high forces be provided. These high forces, which are necessary to overcome friction between the loaded pack assemblies and their slide surfaces, can cause severe wear problems.

Dual screen packs, with appropriate valving to permit selective flow through either filter pack individually, permit replacement of off-stream filter pack without interruption of flow. Filter pack life between replacements or thorough cleansings can be extended by providing additional valving to permit intermittent back-flushing of filter packs without interrupting major flow throughs. The back-flush feature can also be used to fill cleaned or new filter pack to remove air and air contaminated fluid before the filter pack is placed on stream. However, with conventional dual or parallel filter packs, the mechanical operating and maintenance problem can be excessive in view of the number of moving parts, a necessity for multiple valve arrangements, and the need for external devices for interlocks to insure properly operating sequence in relative position of the valves. Conventional plug valve designs, which can cause excessive wear and therefore require valve replacement, often limit the size of flow passages and contribute to high back pressures on dual screen pack units.

It is, therefore, an object of this invention to provide improved screen changing apparatus for use with extruders.

It is a further object of this invention to provide a single flow control valve for extruder screen changing apparatus which is simple in form, easy to operate and economical to manufacture.

It is a still further object of this invention to provide a single flow control valve for extruder screen changing apparatus which upon appropriate valve orientation provides numerous selective flow passages. These and other objects will appear hereinafter.

In accordance with the present invention, there is provided a valve body and stem assembly which can provide, with appropriate radial stem orientation, selective polymer melt flow through a parallel flow, back-flushing screen filter.

The screen filter apparatus has an adapter section, a body section and a separate intermediate valve section for selectively controlling all polymer melt flows between the adapter and the body. The adapter has an inlet and outlet passage with no direct communication between them. The adapter is so constructed to permit fastening one end of each of the respective passages with a polymer melt source and a polymer melt use device, normally an extruder and die. The body has a pair of flow passages, no direct communication between them, for conveying the polymer melt in either direction through a pair of independent screen packs, each supported between breaker plates with independent means for access and changing of each pack.

The valve section secured between the adapter and the body is essentially a single valve body with an essentially cylindrical valve stem, journaled therein. The stem has two essentially duplicate, similarly oriented, axially displaced transverse slots, one an inlet slot, the other an outlet slot; and a dump slot originating diametrically opposite the inlet slot and leading directly or indirectly to an atmospheric drain opening; and a bypass hole essentially parallel to and in the same transverse plane as the outlet slot. The dump slot and inlet slot are in the same transverse plane as the valve inlet port, which communicates with the adapter inlet passage, and the two valve outlet ports, which communicate with the body flow inlet passages. These slots and ports in this transverse plane constitute an inlet valve. The outlets slot is located in the same transverse plane as the valve outlet port, which communicates with the adapter outlet passage, and the two valve inlet ports, which communicate with the body flow outlet passages. These slots and ports in this transverse plane constitute an outlet valve.

The valve ports, stem slots and adapter and body passages form selective polymer flow passages upon radial orientation of the valve stem. When the stem inlet and outlet slots are directly facing the inlet valve inlet and the outlet valve outlet ports, the slots provide communicating passages from the inlet valve inlet port to both body flow inlet passages through to the outlet valve outlet port so that continuous polymer melt flow passages are formed from the adapter inlet to adapter outlet through both body passages and both packs contained therein. In this phase both packs can be operated in parallel to filter polymer melt.

With stem rotation, the slot orientations will provide communicating passages from inlet valve inlet port to the outlet valve outlet port through only a single pair of body flow inlet passages having a common continuous body flow passage to provide a flow path from the adapter inlet through a single screen pack to adapter outlet. With selectivity, based on stem orientation, of the ports and interconnecting passages, either screen pack can be operated individually to filter the entire polymer melt flow, while the off-stream pack is available for cleaning or replacement without disrupting polymer melt flow through the filter apparatus.

With additional stem rotation, from either single screen pack operating position, the bypass hole forms an open communicating passage from the discharge valve outlet port to one of the two outlet valve inlet ports and the dump slot simultaneously forms an open communicating passage with one of the inlet valve outlet ports so that in addition to normal operation of one screen pack, a subsidiary passage from the outlet valve outlet port through the bypass hole and a body outlet port forms a back-flush or fill passage to the other screen pack and the communicating body inlet port, inlet valve outlet port and dump slot form a back-flush or drain passage to the atmosphere. By this means, back-flushing of the off-stream filter can be accomplished without interrupting the major flow or causing major pressure drops through the on-stream filter.

Thus, the five operating positions can be visualized by the appropriate valve body and valve stem orientation.

With an additional stem orientation to a position where the valve stem inlet slot is facing directly away from the valve inlet port, the only passage from the adapter inlet would be through the inlet valve inlet port through the dump slot to the atmospheric drain. In operation, all polymer melt flow can be bypassed from the extruder to the atmosphere without filtration.

The invention, as well as the above important objects and advantages of the invention will become apparent as the same is more fully understood from the following description, which, taken in connection with the accompanying drawings, discloses preferred embodiments of the invention wherein:

FIGURE 2 is a side elevational view of the apparatus of FIGURE 1;

FIGURE 3 is an end elevational view of the apparatus of FIGURE 1;

FIGURE 4 is a side elevational view of the valve body and stem;

FIGURE 5 is an end sectional view of the valve body and stem showing the valve ports and stem slots;

Figure 1:
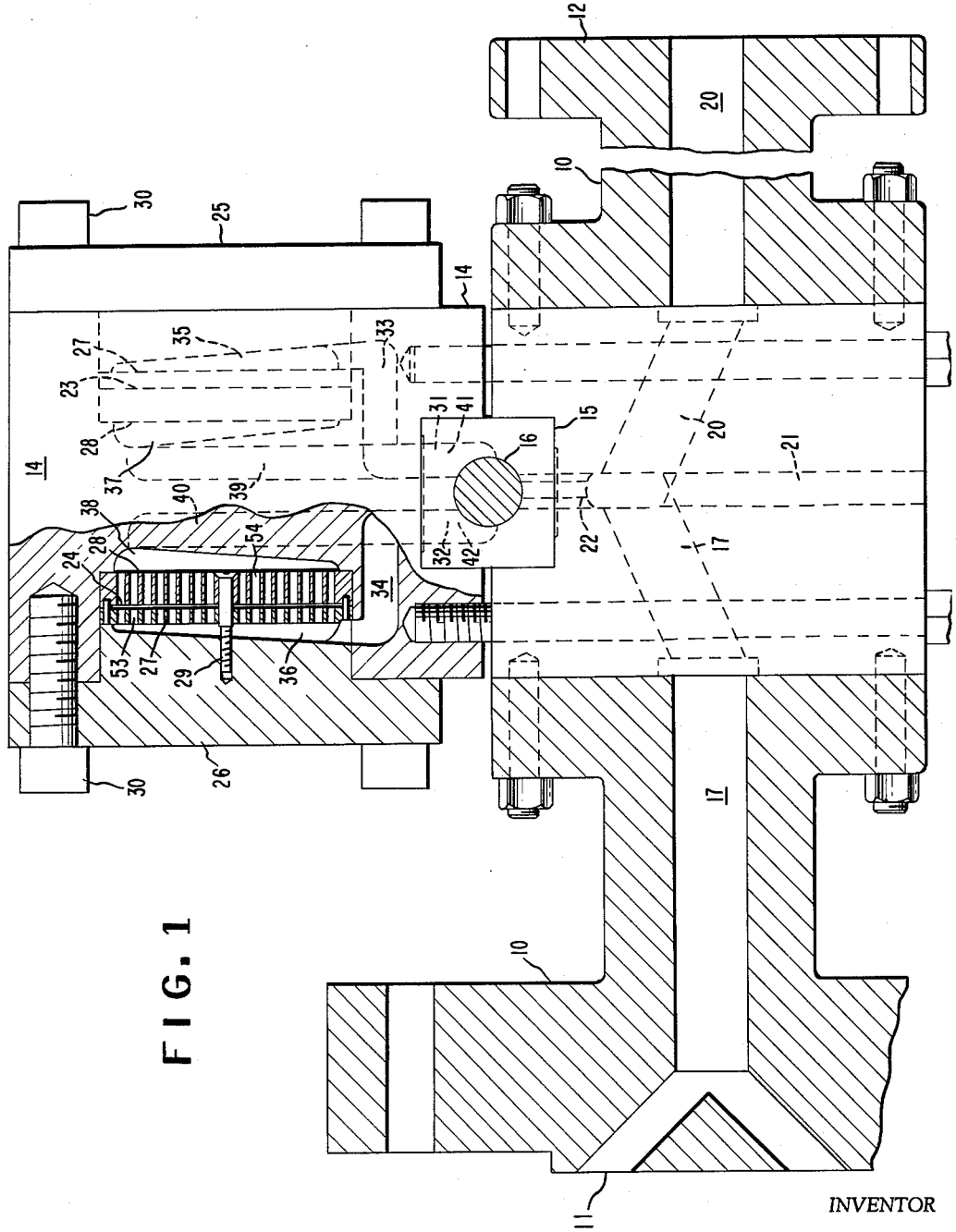
FIGURE 1 is a plan view, partly in section, of the screen changing apparatus of the present invention showing the adapter section, body section and intermediate valve section.

In the drawings, an adapter section 10, adapted to be connected at end 11 to a polymer melt source, e.g., an extruder, and at end 12 to a polymer melt use device, e.g., a die or melt cutter, is attached with studs 13 to screen pack body section 14. A valve body 15 having a valve stem 16 journaled therein is positioned within and between adapter section 10 and body section 14.

The adapter section 10 contains an adapter inlet passage 17 which leads to valve body 15 and is in communicating relationship with valve inlet port 18. Valve inlet port 18 is positioned near the lower end of valve body 15. Leading from and in communicating relationship with valve body outlet port 19, is adapter outlet passage 20 which exits from valve body 15 vertically above inlet passage 17. In a line intermediate inlet passage 17 and outlet passage 20, is adapter atmospheric drain passage 21 which is in communicating relationship with valve drain port 22.

Screen pack body section 14 contains parallel mounted right side screen pack 23 and left side screen pack 24 which are held in place in body section 14 by end plates 25 and 26. The screen packs are mounted between back-flush screen support breaker plates 27 and forward flow screen support breaker plates 28; the whole unit held together and secured to the interior of end plates 25 and 26 by a flat head cap screw 29. Access to the screen packs for changing is accomplished by removing the end plates with attached screen packs and breaker plates. End plates 25 and 26 are secured to body section 14 by cap screws 30.

In the same transverse plane as valve inlet port 18, but positioned on the opposite side of valve stem 16, are two independent valve outlet ports 31 and 32 which are in communicating relationship with a pair of independent flow inlet passages 33 and 34. Passage 33 leads to the right side screen pack 23 and connects with distribution chamber 35 formed by end plate 25 and back-flush screen support breaker plate 27. Similarly, passage 34 leads to the left side screen pack 24 and connects with distribution chamber 36 formed by end plate 26 and back-flush screen support breaker plate 27. Right side collection chamber 37 and left side collection chamber 38 are formed between body section 14 and the forward flow screen support breaker plates 28 and communicate with flow outlet passages 39 and 40. Passages 39 and 40 enter valve body 15 through independent valve inlet ports 41 and 42 which are in the same transverse plane as valve outlet port 19 and vertically above the two independent valve outlet ports 31 and 32.

Valve stem 16, journaled in valve body 15 and held in place by retaining rings 43, is actuated by hand crank 44 through a gear reducer 45 which is mounted on adapter section 10 and body section 14 with bracket 46. Retaining ring 43 retains bushings 55 and packings 56 at each end of the stem to provide a seal between the stem and valve body.

The stem slots form selective communicating passages through the body section and valve section. Inlet slot 47 and outlet slot 48 are two essentially duplicate, similarly oriented axially displaced transverse slots, inlet slot 47 being in the same transverse plane as valve inlet port 18 and the two independent valve outlet ports 31 and 32 and adapted to be in communicating relationship with these ports upon appropriate radial orientation of stem 16. Outlet slot 48 is in the same transverse plane as valve outlet port 19 and the two independent valve inlet ports 41 and 42 and is adapted to be in communicating relationship with these ports upon orientation of stem 16. An axially displaced dump slot 49 is diametrically opposite inlet slot 47 and extends axially upward to a point intermediate inlet slot 47 and outlet slot 48, the top portion of which is in communicating relationship with valve drain port 22 and adapter drain passage 21 upon the appropriate stem orientation through a transverse stem hole 50, which is parallel to dump slot 49 and in the same transverse plane as valve drain port 22 and the top portion of dump slot 49, and a stem hole 51 which joins the top portion of dump slot 49 to stem hole 50. A bypass hole 52 is parallel to and in the same transverse plane as outlet slot 48.

In normal operation, with both screen packs on stream, polymer from an extruder flows through adapter inlet passage 17 to valve body 15, at which point is enters valve inlet port 18. Polymer from valve inlet port 18 is then directed in equivalent paths by valve stem inlet slot 47 in valve stem 16, which is in operating position 4 shown in FIGURES 6–8, out through the two independent valve outlet ports 31 and 3 thereby permitting simultaneous forward flow through both screen packs. The split flow from outlet ports 31 and 32 flows through body flow inlet passages 33 and 34 into distribution chambers 35 and 36. Distributed polymer will then flow through holes 53 in back-flush screen support breaker plates 27 and through holes in right side screen pack 23 and left side screen pack 24 to filter contaminates from the polymer. Clean filtered polymer will then flow through the holes 54 in forward flow screen support breaker plates 28 into collection chambers 37 and 38 and thus via body flow outlet passages 39 and 40 to the valve inlet ports 41 and 42. The orientation of stem outlet slot 48 in position 4 permits both streams to combine and discharge through valve outlet port 19 to adapter outlet passage 20 and on to the extruder die or die plates.

Figure 6:
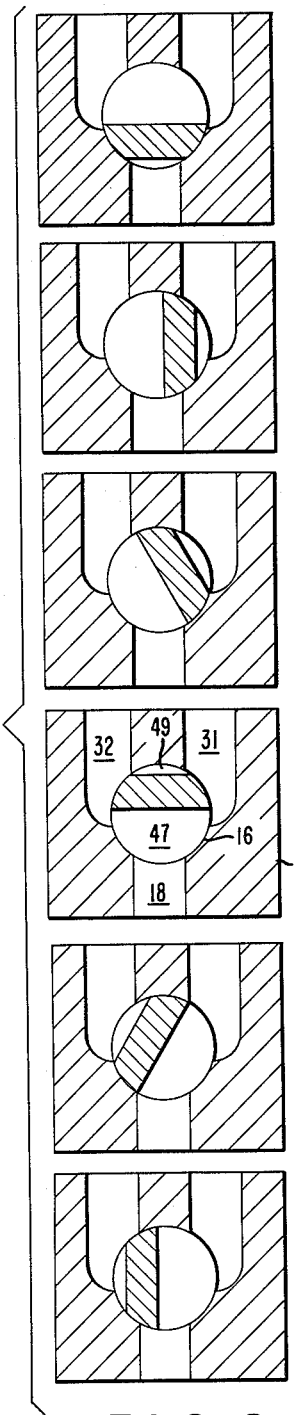
FIGURE 6 is a sectional view of the inlet valve taken along the line 6—6 of FIGURE 4.
Figure 7:
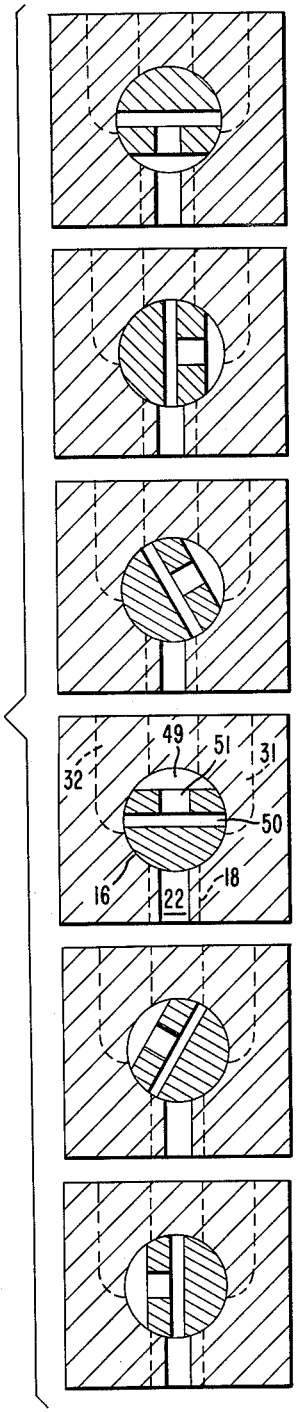
FIGURE 7 is a sectional view of the dump valve taken along the line 7—7 of FIGURE 4.
Figure 8:
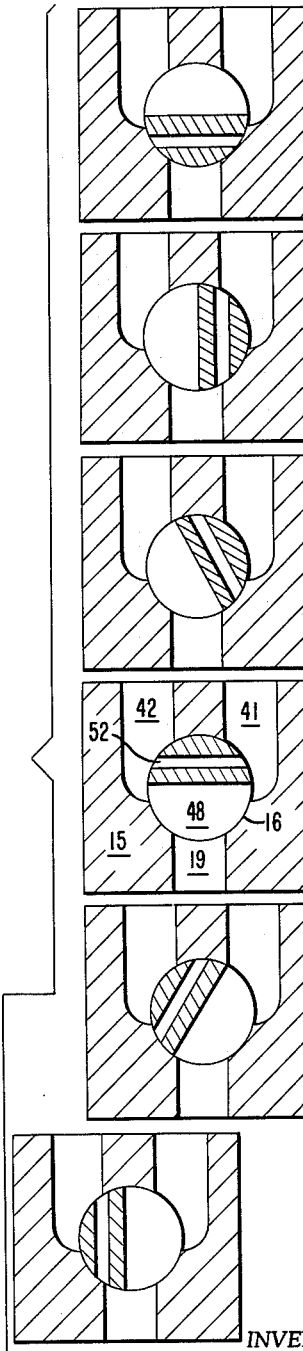
FIGURE 8 is a sectional view of the outlet valve taken along the line 8—8 of FIGURE 4.

To operate the unit of flow through one side only, valve stem 16 must be rotated 60° in either the clockwise or counter-clockwise direction from position 4 to position 3 or 5 as shown in FIGURES 6–8. A rotation of 60° in the clockwise direction provides flow through the left side screen pack only since the orientation of inlet slot 47 and outlet slot 48 will not permit flow through the right side ports and passages. The flow through the left side screen pack is the same as described above in the operation of both screen pack assemblies. Similarly, a rotation of 60° in the counter-clockwise direction to position 5 provides flow only through the right side screen pack with no flow permitted through the left side ports and passages.

Rotation of valve stem 16 an additional 30° from one side only operation to a position 90° from position 4 will provide forward flow through one screen pack assembly and backward back-flushing flow through the other screen pack as shown by positions 2 and 6 in FIGURES 6–8. In position 2, polymer flows through left side screen pack but not through the right side screen pack since stem inlet slot 47 does not connect valve inlet port 18 to the right side valve outlet port 32; whereas, in position 6, flow is provided through the right side screen pack but not the left side. However, bypass hole 52 is oriented to permit passage of filtered polymer from valve outlet port 19 into either valve inlet port 41 or valve inlet port 42. Also, dump slot 49 permits flow from either valve outlet 31 or valve outlet 32 through stem hole 51 and one-half of stem hole 50 into valve drain port 22 and thus adapter drain passage 21 to the atmosphere as waste.

Hence, with a continuous open flow path, a reverse flow of clean filtered polymer occurs from valve outlet port 19 through bypass hole 52 into either valve inlet port 41 or valve inlet port 42 from which flow will be through either body flow outlet passage 39 or outlet passage 40 into either collection chamber 37 or 38 (distribution chamber in reverse flow) and through holes 54 in forward flow screen support breaker plate 28 in the reverse of normal direction. Backward flow of filter polymer through either screen pack 23 or 24 in reverse of normal direction will lift off layer of residue previously collected on the screens in the normal forward flow operation and flush the residue through holes 53 in back-flush screen support breaker plate 27 into and through distribution chamber 35 or 36. Contaminated reverse flush polymer then flows in sequence through either body flow inlet passage 33 or inlet passage 34, either valve outlet port 31 or outlet port 32, stem dump slot 49, stem hole 51, stem hole 50, valve drain port 22 and adapter drain passage 21 to waste. The back-flush flow rate can be set at a given rate for a suitable operating condition by varying the diameter of stem bypass hole 52 during fabrication or by use of a polymer valve in the drain line.

Rotation of stem 16 to a position 180° from position 4 gives position 1 of FIGURES 6–8 which will stop flow through both screen packs as inlet slot 47 does not connect valve inlet port 18 to either valve outlet port 31 or outlet port 32. However, dump slot 49 connects valve inlet port 18 to valve drain port 22 and permits polymer from the extruder to flow in sequence through adapter inlet passage 17, valve inlet port 18, stem dump 49, valve drain port 22 and adapter drain passage 21 to waste or scrap collection.

Mechanical operating and maintenance advantages of the single valve for control of all flows within the screen changing apparatus over previous multiple valve units are readily apparent. Moving parts are reduced to one with only one rotary valve stem seal being required. The preferred design has two as the valve stem is extended out both ends of the valve body to eliminate unbalanced end thrust on the valve stem. There is no need for extrenal devices or interlocks which are necessary with multiple valve units to insure proper operating sequence and relative position of valves.

Disposition of the valve permits the valve to be made as a separate removable unit of minimum size from which there are numerous advantages. All parts subject to wear in operation are incorporated in a removable and replaceable valve member which can be fabricated of wear and galling-resistant materials of construction, while non-wearing members can be made of less expensive and more readily fabricated materials of construction. Valve damage will not cause costly reworking of soft valve ports in large changer bodies and cause a necessity for oversized non-interchangeable valve stems, as may be the case with integral valve designs not having removable hardened wear members. The present valve permits large flow passages for a given valve stem size and also minimizes temporary pressure drop increases which occur in going to and from the five normal operating positions. A somewhat greater pressure drop increase will occur in going to and from the dump position. A positive shut-off can be avoided in going to and from all operating positions.

It is appreciated that the screen changing apparatus of this invention is simple in form, easy to operate, and economical to manufacture compared with the more conventional screen changing apparatus.

It is also recognized that while the screen changing apparatus of this invention is particularly adapted to use with an extruder apparatus, it will be useful in many other applications where filter screens in flow lines must be changed without interrupting flow through the apparatus. The changing of a used or fouled screen unit can be effected in a short time. Additionally, it permits the back flushing for freeing a fouled screen unit without the necessity, at times, of complete substitution.

What is claimed is:

1. An apparatus comprising, in combination: an adapter section, a body section and an intermediate valve section interposed within and between said adapter and said body, said adapter section having an inlet passage to said intermediate valve section and an outlet passage from said valve section, said body section comprising two pairs of breaker plates, two screen packs each of which is supported between the breaker plates of a pair of said two pairs of breaker plates and independent means for access and changing said screen packs, said body section having a pair of independent flow inlet passages from said valve section to said screen packs and a pair of independent flow outlet passages from said screen packs to said valve section, said valve section comprising a single valve body having a valve inlet port in communicating relationship with said adapter inlet passage, a valve outlet port in communicating relationship with said adapter outlet passage, two valve outlet ports in communicating relationship with said body flow inlet passages and and two valve inlet ports in communicating relationship with said body flow outlet passages; a valve stem journaled therein, said stem having (1) two essentially duplicate, similarly oriented, axially displaced transverse inlet and outlet slots, (2) an axially displaced dump slot diametrically opposite said inlet slot which extends axially intermediate said inlet slot and outlet slot and which is adapted to communicate with an atmospheric drain, and (3) a bypass hole, essentially parallel to and in the same transverse plane as said outlet slot, said inlet slot being in the same transverse plane as said valve inlet port and said two valve outlet ports and said outlet slot being in the same transverse plane as said valve outlet port and said two valve inlet ports; and means for rotating said stem.

2. An apparatus comprising, in combination: an adapter section, a body section and an intermediate valve section interposed within and between said adapter and said body; said adapter section having an inlet passage to said intermediate valve section, an outlet passage from said valve section and a drain passage from said valve section intermediate said inlet passage and outlet passage; said body section comprising two pairs of breaker plates, two parallel screen packs each of which is supported between the breaker plates of a pair of said two pairs of breaker plates and independent means for access and changing said screen packs, said body section having a pair of independent flow inlet passages from said valve section to said screen packs and a pair of independent flow outlet passages from said screen packs to said valve section; said valve section comprising a single valve body having a valve inlet port in communicating relationship with said adapter passage, a valve outlet port in communicating relationship with said adapter outlet passage, a valve drain port in communicating relationship with said adapter drain passage, two valve outlet ports in communicating relationship with said body flow inlet passages and two valve inlet ports in communicating relationship with said body flow outlet passages; a valve stem journaled therein, said stem having (1) two essentially duplicate, similarly oriented, axially displaced transverse slots, an inlet slot and outlet slot, (2) an axially displaced dump slot diametrically opposite said inlet slot which extends axially intermediate said inlet slot and outlet slot, (3) a transverse stem hole parallel to said dump slot and in the same transverse plane as said valve drain port, (4) a stem hole which joins the top portion of said dump slot to said transverse stem hole, and (5) a bypass hole parallel to and in the same transverse plane as said outlet slot, said inlet slot being in the same transverse plane as said valve inlet port and said two valve outlet ports and said outlet slot being in the same transverse plane as said valve outlet port and said two valve inlet ports; and means for rotating said stem, wherein with appropriate orientation of said stem the valve ports, stem slots and body passages form selective communicating passages through said body section and said valve section.

References Cited by the Examiner
UNITED STATES PATENTS

| | | | |
|---|---|---|---|
| 2,184,177 | 12/1939 | Burrell | 18—13 |
| 2,639,275 | 5/1953 | Vickers et al. | 18—12 X |
| 2,841,821 | 7/1958 | Phipps. | |
| 3,007,199 | 11/1961 | Curtis | 18—12 |
| 3,033,256 | 5/1962 | Schrenes | 18—12 X |
| 3,059,276 | 10/1962 | Yokana | 18—12 |
| 3,145,746 | 8/1964 | Scher | 18—12 X |
| 3,146,494 | 9/1964 | Sponaugle | 18—12 |

WILLIAM J. STEPHENSON, *Primary Examiner.*